(12) United States Patent
Song

(10) Patent No.: US 12,345,524 B2
(45) Date of Patent: Jul. 1, 2025

(54) BATTERY MODULE STRAIN ESTIMATING APPARATUS AND METHOD

(71) Applicant: LG ENERGY SOLUTION, LTD., Seoul (KR)

(72) Inventor: Seung-Ho Song, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 591 days.

(21) Appl. No.: 17/790,093

(22) PCT Filed: Oct. 7, 2021

(86) PCT No.: PCT/KR2021/013831
§ 371 (c)(1),
(2) Date: Jun. 29, 2022

(87) PCT Pub. No.: WO2022/080763
PCT Pub. Date: Apr. 21, 2022

(65) Prior Publication Data
US 2023/0045081 A1 Feb. 9, 2023

(30) Foreign Application Priority Data

Oct. 14, 2020 (KR) ........................ 10-2020-0132935

(51) Int. Cl.
*G01B 21/32* (2006.01)
*H01M 10/42* (2006.01)

(52) U.S. Cl.
CPC ........ *G01B 21/32* (2013.01); *H01M 10/4285* (2013.01)

(58) Field of Classification Search
CPC ........................ G01B 21/32; H01M 10/4285
See application file for complete search history.

(56) References Cited

U.S. PATENT DOCUMENTS

2009/0233174 A1 9/2009 Okabe et al.
2014/0107949 A1 4/2014 Arnold et al.
(Continued)

FOREIGN PATENT DOCUMENTS

CN 105807227 A 7/2016
CN 106768567 A 5/2017
(Continued)

OTHER PUBLICATIONS

Li, "Theoretical Analysis of Stresses for Crystalline Cells in PV Modules," Journal of Hunan University Natural Sciences, vol. 47, No. 9, 2020, pp. 137-143, with an English abstract.
(Continued)

*Primary Examiner* — Eric S. McCall
(74) *Attorney, Agent, or Firm* — Birch, Stewart, Kolasch & Birch, LLP

(57) ABSTRACT

A module strain estimating apparatus, including: a module information obtaining unit configured to obtain a plurality of numerical information for a battery module; and a processor configured to: receive the plurality of numerical information from the module information obtaining unit, generate a first profile representing a correspondence between a force applied from the inside to the outside of the battery module and a strain of the battery module, and a second profile representing a correspondence between the force and a stress of the battery module based on a preset learning module and the plurality of numerical information, generate a third profile representing a correspondence between the strain and the stress of the battery module based on the first profile and the second profile, and estimate the strain of the battery module according to the stress of the battery module based on the third profile.

11 Claims, 7 Drawing Sheets

(56) References Cited

U.S. PATENT DOCUMENTS

| | | |
|---|---|---|
| 2014/0351177 A1 | 11/2014 | Park et al. |
| 2015/0160302 A1 | 6/2015 | Xu et al. |
| 2016/0126535 A1 | 5/2016 | Qiao et al. |
| 2016/0133899 A1 | 5/2016 | Qiao et al. |
| 2016/0209473 A1 | 7/2016 | You et al. |
| 2017/0023649 A1 | 1/2017 | You et al. |
| 2017/0324122 A1 | 11/2017 | Poirier et al. |
| 2018/0040920 A1 | 2/2018 | Takatsuka et al. |
| 2018/0095140 A1 | 4/2018 | Park et al. |
| 2019/0056452 A1 | 2/2019 | You et al. |
| 2019/0094003 A1 | 3/2019 | Kim et al. |
| 2019/0377835 A1 | 12/2019 | Kong et al. |
| 2020/0044293 A1 | 2/2020 | Choi et al. |
| 2020/0158596 A1 | 5/2020 | Kim et al. |
| 2020/0168959 A1 | 5/2020 | Hettrich |
| 2020/0343600 A1* | 10/2020 | Song .................. H01M 10/633 |
| 2021/0197691 A1 | 7/2021 | Stefanopoulou et al. |
| 2021/0344057 A1 | 11/2021 | Seo et al. |

FOREIGN PATENT DOCUMENTS

| | | |
|---|---|---|
| CN | 108520133 A | 9/2018 |
| CN | 109425836 A | 3/2019 |
| CN | 109766618 A | 5/2019 |
| JP | 5082861 B2 | 11/2012 |
| JP | 2019-48309 A | 3/2019 |
| JP | 2020-53202 A | 4/2020 |
| JP | 2020-513644 A | 5/2020 |
| JP | 6780212 B2 | 11/2020 |
| KR | 10-2005-0056177 A | 6/2005 |
| KR | 10-2009-0028661 A | 3/2009 |
| KR | 10-1653689 B1 | 9/2016 |
| KR | 10-2017-0011010 A | 2/2017 |
| KR | 10-2018-0087041 A | 8/2018 |
| KR | 10-2018-0099668 A | 9/2018 |
| KR | 10-2070684 B1 | 1/2020 |
| KR | 10-2108279 B1 | 5/2020 |
| WO | WO2016/143400 A | 9/2016 |
| WO | 2020/145549 A1 | 7/2020 |

OTHER PUBLICATIONS

Extended European Search Report dated Jan. 12, 2023 for Application No. 21880410.2.

International Search Report for PCT/KR2021/013831 (PCT/ISA/210) mailed on Jan. 19, 2022.

* cited by examiner

BATTERY MODULE STRAIN ESTIMATING APPARATUS AND METHOD

TECHNICAL FIELD

The present application claims priority to Korean Patent Application No. 10-2020-0132935 filed on Oct. 14, 2020 in the Republic of Korea, the disclosures of which are incorporated herein by reference.

The present disclosure relates to a module strain estimating apparatus and method, and more particularly, to a module strain estimating apparatus and method capable of estimating strain of a battery module based on a plurality of numerical information of the battery module.

BACKGROUND ART

Recently, the demand for portable electronic products such as notebook computers, video cameras and portable telephones has increased sharply, and electric vehicles, energy storage batteries, robots, satellites and the like have been developed in earnest. Accordingly, high-performance batteries allowing repeated charging and discharging are being actively studied.

Batteries commercially available at present include nickel-cadmium batteries, nickel hydrogen batteries, nickel-zinc batteries, lithium batteries and the like. Among them, the lithium batteries are in the limelight since they have almost no memory effect compared to nickel-based batteries and also have very low self-discharging rate and high energy density.

Generally, a swelling phenomenon in which a battery swells due to various reasons such as degradation by use, overcharging, and exposure to high temperatures may occur in a battery. If swelling occurs continuously in the battery so that the swelling pressure exceeds the stress of a battery junction, the battery junction may open and cause a battery fire or explosion.

In addition, the swelling phenomenon of the battery may cause more fatal problems when one or more batteries are inserted inside a battery module. For example, when the batteries inserted inside the battery module swell, the swelling pressure is applied to an inner wall of the battery module, and the battery module may be deformed due to the swelling pressure. Moreover, if the battery module is deformed more than a limit value, namely if the swelling pressure exceeds the stress of the junction of the battery module, the battery module may be damaged.

DISCLOSURE

Technical Problem

The present disclosure is designed to solve the problems of the related art, and therefore the present disclosure is directed to providing a module strain estimating apparatus and method, which may easily estimate strain of a battery module corresponding to a stress of the battery module by deriving a correspondence between the stress and the strain according to various numerical information of the battery module using a learning module.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

A module strain estimating apparatus according to one aspect of the present disclosure may comprise: a module information obtaining unit configured to obtain a plurality of numerical information for a battery module; and a processor configured to receive the plurality of numerical information from the module information obtaining unit, generate a first profile representing a correspondence between a force applied from the inside of the battery module to the outside and a strain of the battery module and a second profile representing a correspondence between the force and a stress of the battery module based on a preset learning module and the plurality of numerical information, generate a third profile representing a correspondence between the strain and the stress of the battery module based on the first profile and the second profile, and estimate a strain of the battery module according to a stress of the battery module based on the third profile.

The battery module may be configured to include: a body unit having one surface opened so that one or more battery cells are accommodated therein; and a cover configured to be coupled to the opened one surface.

The module information obtaining unit may be configured to obtain a thickness of the cover, a thickness of the body unit, a height of the battery module, a width of the battery module, and a length of the battery module as the plurality of numerical information of the battery module.

The learning module may be learned to estimate a strain and a stress corresponding to each of a plurality of forces preset for a criterion module.

The learning module may include: a first layer configured to endow a first weight corresponding to each of the plurality of numerical information based on a pre-trained result for the criterion module, and generate a plurality of combination information based on the plurality of numerical information to which the first weight is endowed; and a second layer configured to endow a second weight corresponding to each of the plurality of combination information generated at the first layer based on the pre-trained result, and generate a strain and a stress for the battery module corresponding to each of the plurality of forces based on the plurality of combination information to which the second weight is endowed.

The first layer may include a plurality of nodes respectively corresponding to the plurality of combination information and is configured to set the first weight corresponding to each of the plurality of numerical information for each of the plurality of nodes.

The second layer may include a plurality of nodes respectively corresponding to a plurality of strains and a plurality of stresses corresponding to each of the plurality of forces and is configured to set the second weight corresponding to each of the plurality of combination information for each of the plurality of nodes.

The processor may be configured to generate the first profile by receiving a strain for the battery module corresponding to each of the plurality of forces from the learning module, and generate the second profile by receiving a stress for the battery module corresponding to the plurality of forces from the learning module.

The processor may be configured to generate the third profile by matching a strain and a stress for the battery module corresponding to each of the plurality of forces based on the first profile and the second profile.

A module strain estimating apparatus according to another aspect of the present disclosure may further comprise a pressure information obtaining unit configured to obtain pressure information for a target pressure from the outside.

The processor may be configured to estimate a strain of the battery module for the target pressure by receiving the pressure information from the pressure information obtaining unit and inputting the target pressure to the third profile.

A battery pack according to still another aspect of the present disclosure may comprise the module strain estimating apparatus according to one aspect of the present disclosure.

A module strain estimating method according to still another aspect of the present disclosure may comprise: a module information obtaining step of obtaining a plurality of numerical information for a battery module; a first and second profile generating step of generating a first profile representing a correspondence between a force applied from the inside of the battery module to the outside and a strain of the battery module and a second profile representing a correspondence between the force and a stress of the battery module based on a preset learning module and the plurality of numerical information; a third profile generating step of generating a third profile representing a correspondence between the strain and the stress of the battery module based on the first profile and the second profile; and a module strain estimating step of estimating a strain of the battery module according to a stress of the battery module based on the third profile.

Advantageous Effects

According to one aspect of the present disclosure, a correspondence between the stress and the strain of the battery module may be derived to correspond to various dimensional information of the battery module.

In addition, according to one aspect of the present disclosure, since the strain of the battery module with respect to the target pressure may be estimated in advance, the battery module may be designed easier.

The effects of the present disclosure are not limited to the above, and other effects not mentioned herein will be clearly understood by those skilled in the art from the appended claims.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

It should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

Additionally, in describing the present disclosure, when it is deemed that a detailed description of relevant known elements or functions renders the key subject matter of the present disclosure ambiguous, the detailed description is omitted herein.

The terms including the ordinal number such as "first", "second" and the like, may be used to distinguish one element from another among various elements, but not intended to limit the elements by the terms.

Throughout the specification, when a portion is referred to as "comprising" or "including" any element, it means that the portion may include other elements further, without excluding other elements, unless specifically stated otherwise.

In addition, terms such as a processor described in the specification mean a unit that processes at least one function or operation, which may be implemented as hardware or software, or a combination of hardware and software.

In addition, throughout the specification, when a portion is referred to as being "connected" to another portion, it is not limited to the case that they are "directly connected", but it also includes the case where they are "indirectly connected" with another element being interposed between them.

Hereinafter, a preferred embodiment of the present disclosure will be described in detail with reference to the accompanying drawings.

Figure 1:
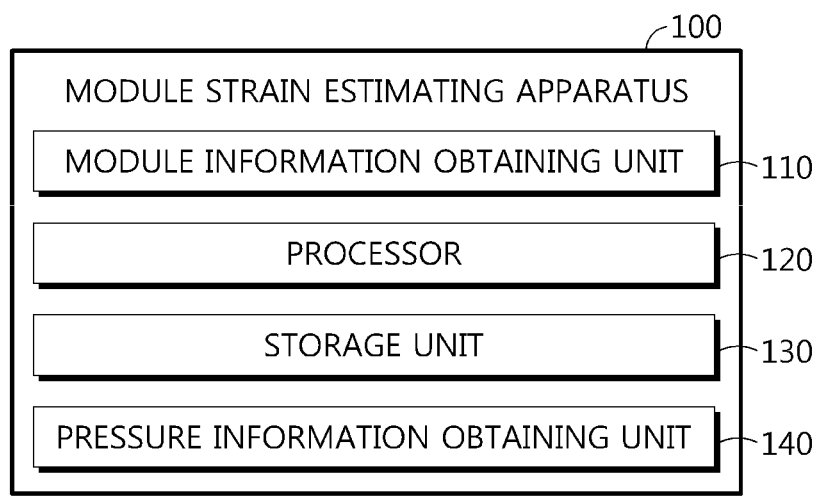
FIG. 1 is a diagram schematically showing a module strain estimating apparatus according to an embodiment of the present disclosure.

FIG. 1 is a diagram schematically showing a module strain estimating apparatus 100 according to an embodiment of the present disclosure.

Referring to FIG. 1, the module strain estimating apparatus 100 according to an embodiment of the present disclosure may include a module information obtaining unit 110 and a processor 120.

The module information obtaining unit 110 may be configured to obtain a plurality of numerical information for the battery module.

Here, the battery module may include one or more battery cells connected in series and/or in parallel. In addition, the battery cell means a physically separable one independent cell that includes a negative electrode terminal and a positive electrode terminal. For example, one pouch-type lithium polymer cell may be regarded as a battery cell.

Figure 2:
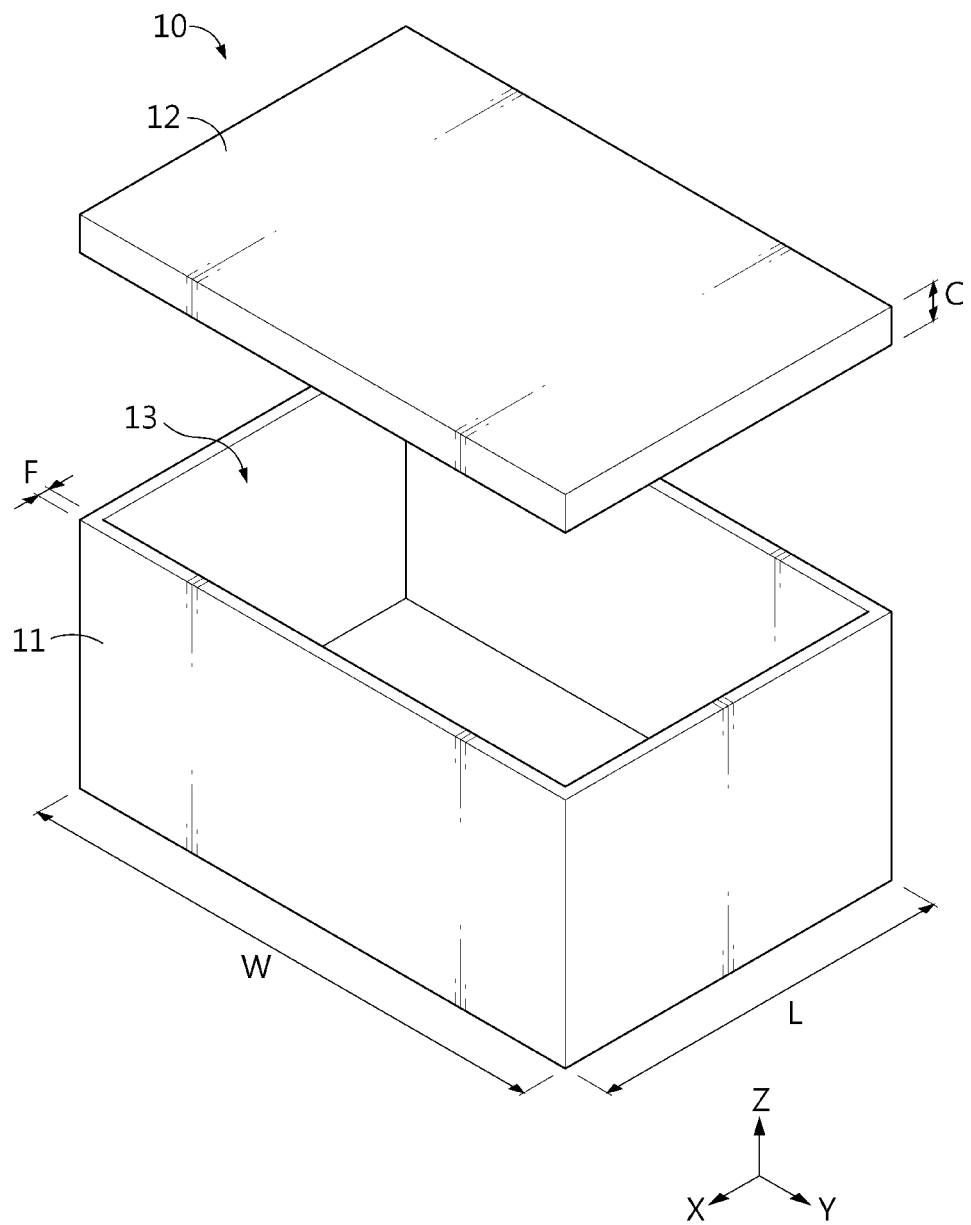
FIGS. 2 and 3 are diagrams schematically showing a battery module according to an embodiment of the present disclosure.
Figure 3:
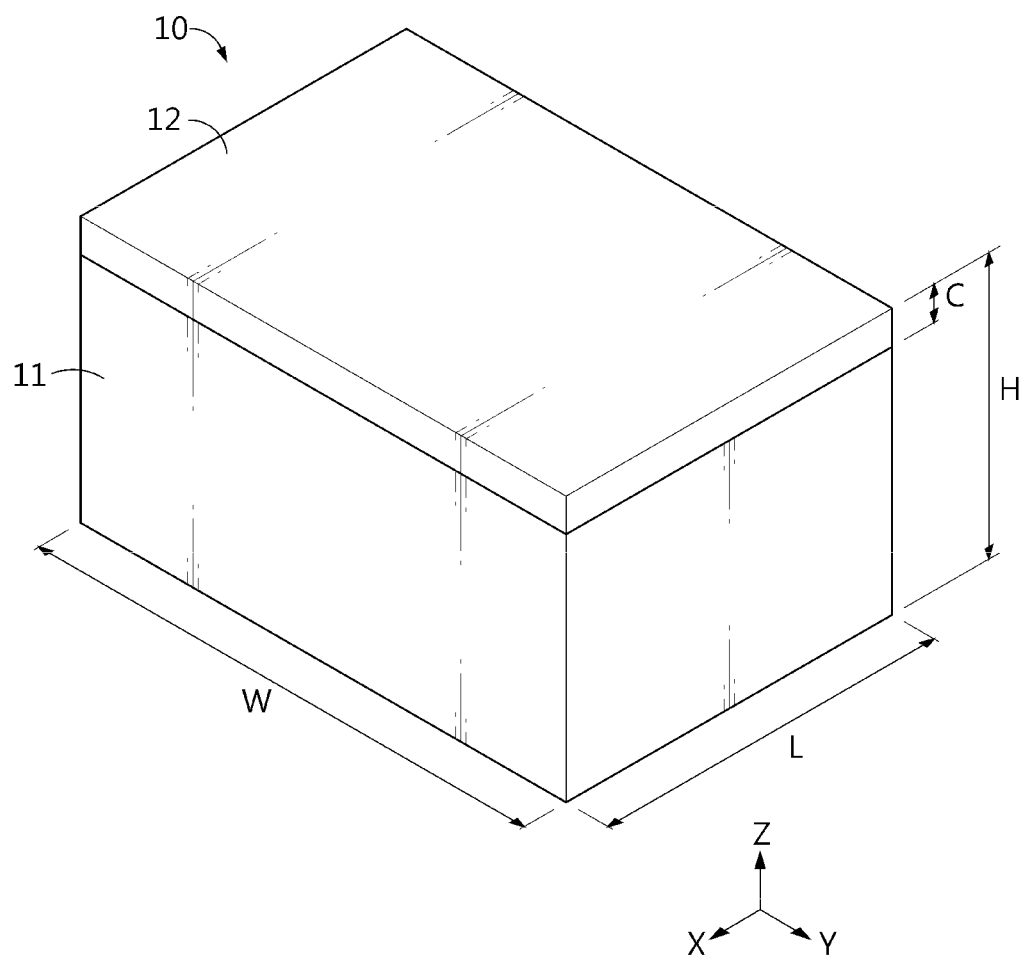

FIGS. 2 and 3 are diagrams schematically showing a battery module 10 according to an embodiment of the present disclosure.

Referring to FIGS. 2 and 3, the battery module 10 may include a body unit 11 and a cover 12. Here, the body unit 11 may be configured to have one surface opened so that one or more battery cells are accommodated therein. In addition, the cover 12 may be configured to include a cover 12 configured to be coupled to the opened one surface. In addition, one or more battery cells may be accommodated in an accommodation space 13 included in body unit 11.

However, in the embodiments of FIGS. 2 and 3, it is explained that one surface in the upper direction (z direction) of the body unit 11 is opened to form the accommodation space 13 and the cover 12 is coupled in the upper direction (z direction) of the body unit 11, but it should be noted that any one of six surfaces of the body unit 11 may be opened. That is, the module information obtaining unit 110 according to the present disclosure may obtain a thickness C of the cover 12, a thickness F of the body unit 11, a height H of the battery module 10, a width W of the battery module 10, and a length L of the battery module 10, regardless of the opened surface of the body unit 11.

For example, the module information obtaining unit 110 may be configured to obtain the thickness C of the cover 12, the thickness F of the body unit 11, the height H of the battery module 10, the width W of the battery module 10, and the length L of the battery module 10 as a plurality of numerical information for the battery module 10.

Preferably, the module information obtaining unit 110 may obtain a plurality of numerical information for the battery module 10 for the thickness C of the cover 12, the thickness F of the body unit 11, the height H of the battery module 10, the width W of the battery module 10, and the length L of the battery module 10, in a state where an end plate is not attached to the battery module 10.

The processor 120 may be configured to receive the plurality of numerical information from the module information obtaining unit 110.

Specifically, the processor 120 and the module information obtaining unit 110 may be connected to communicate with each other. Accordingly, the processor 120 may receive the plurality of numerical information for the battery module 10 from the module information obtaining unit 110.

The processor 120 may be configured to generate a first profile P1 representing a correspondence between a force applied from the inside of the battery module 10 to the outside and a strain of the battery module 10 and a second profile P2 representing a correspondence between the force and a stress of the battery module 10, based on a preset learning module and the plurality of numerical information.

Here, the learning module may be learned to estimate a strain and a stress corresponding to each of a plurality of forces preset for a criterion module. In addition, the processor 120 may generate the first profile P1 and the second profile P2 by inputting the plurality of numerical information for the battery module 10 to the learning module.

Figure 4:
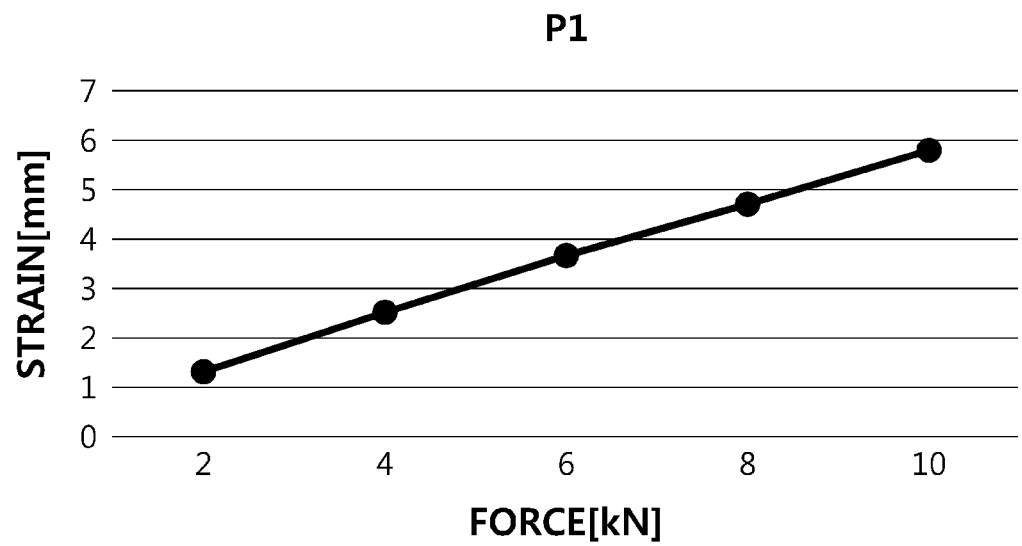
FIG. 4 is a diagram schematically showing an example of a first profile according to an embodiment of the present disclosure.
Figure 5:
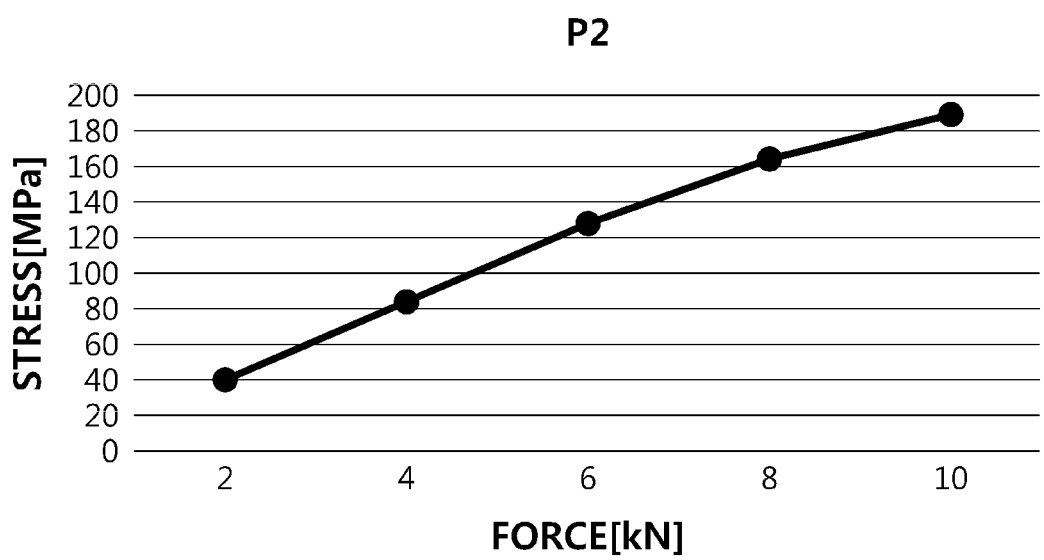
FIG. 5 is a diagram schematically showing an example of a second profile according to an embodiment of the present disclosure.

The first profile P1 and the second profile P2 will be described with reference to FIGS. 4 and 5, respectively. FIG. 4 is a diagram showing an example of the first profile P1 according to an embodiment of the present disclosure. FIG. 5 is a diagram showing an example of the second profile P2 according to an embodiment of the present disclosure.

Referring to FIG. 4, the first profile P1 may be a profile representing the strain of the battery module 10 with respect to the force applied from the inside of the battery module 10 to the outside. That is, the first profile P1 may represent the correspondence between the force applied from the inside of the battery module 10 to the outside and the strain of the battery module 10.

In the embodiment of FIG. 4, when forces of 2 kN, 4 kN, 6 kN, 8 kN and 10 kN are respectively applied from the inside of the battery module 10, the strain of the battery module 10 may be 1.32 mm, 2.54 mm, 3.67 mm, 4.70 mm and 5.78 mm, respectively.

For example, if one or more battery cells included in the battery module 10 swell due to the swelling phenomenon, a force may be applied to an inner wall of the battery module 10 due to the swelling pressure of the battery cells. That is, the first profile P1 may represent the correspondence between the force applied to the inner wall of the battery module 10 due to the swelling of the battery cell and the strain of the battery module 10 due to this force.

In addition, in the embodiment of FIG. 5, when forces of 2 kN, 4 kN, 6 kN, 8 kN and 10 kN are respectively applied from the inside of the battery module 10, the stress of the battery module 10 may be 40.2 MPa, 83.7 MPa, 128.6. MPa, 164.1 MPa and 189.6 MPa, respectively.

For example, if one or more battery cells included in the battery module 10 swell due to the swelling phenomenon, the stress of the battery module 10 may increase due to the swelling pressure of the battery cells. That is, the second profile P2 may represent the correspondence between the force applied to the inner wall of the battery module 10 due to the swelling of the battery cell and the stress of the battery module 10.

The processor 120 may be configured to generate a third profile P3 representing a correspondence between the strain and the stress of the battery module 10 based on the first profile P1 and the second profile P2.

Referring to FIGS. 4 and 5, both the first profile P1 and the second profile P2 may be related to the force applied from the inside of the battery module 10 to the outside. Accordingly, the processor 120 may generate the third profile P3 using the first profile P1 and the second profile P2.

Figure 6:
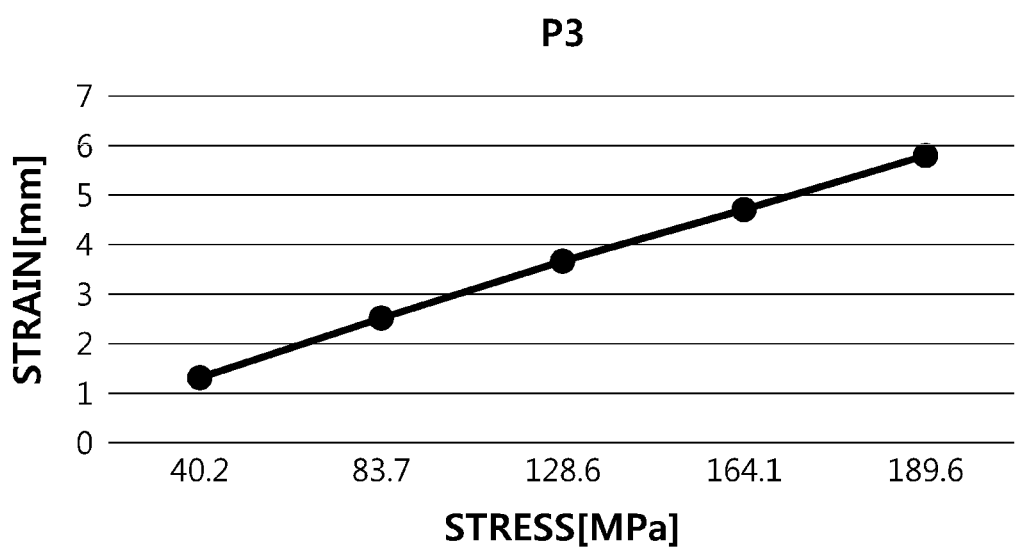
FIG. 6 is a diagram schematically showing an example of a third profile according to an embodiment of the present disclosure.

The third profile P3 will be described with reference to FIG. 6. FIG. 6 is a diagram showing an example of the third profile P3 according to an embodiment of the present disclosure.

Referring to FIG. 6, the third profile P3 may be a profile representing a correspondence between a stress and a strain of the battery module 10.

Specifically, in the embodiment of FIG. 6, when the stress of the battery module 10 is 40.2 MPa, 83.7 MPa, 128.6 MPa, 164.1 MPa, and 189.6 MPa, the strain of the battery module 10 may be 1.32 mm, 2.54 mm, 3.67 mm, and 4.70 mm and 5.78 mm, respectively.

That is, the processor 120 may generate the first profile P1 and the second profile P2 using a learning module, and generate the third profile P3 based on the generated first profile P1 and second profile P2.

The processor 120 may be configured to estimate a strain of the battery module 10 according to the stress of the battery module 10 based on the third profile P3.

Specifically, the processor 120 may estimate the strain of the battery module 10 with respect to an arbitrary magnitude of stress based on the third profile P3 generated for the battery module 10.

For example, the module strain estimating apparatus 100 according to an embodiment of the present disclosure may be used in the process of designing the battery module 10. That is, in the process of designing the battery module 10, when a plurality of numerical information of the battery module 10 are obtained by the module information obtaining unit 110, the processor 120 may generate a third profile P3 for the battery module 10. That is, the correspondence between the stress and the strain for the battery module 10 being designed may be easily and quickly derived by the processor 120. Accordingly, by using the third profile P3 generated by the module strain estimating apparatus 100 in the process of designing the battery module 10, the battery module 10 may be designed more easily.

Meanwhile, the processor 120 of the module strain estimating apparatus 100 according to an embodiment of the present disclosure may optionally include an application-specific integrated circuit (ASIC), another chipset, a logic circuit, a register, a communication modem, and a data processing device, and the like, known in the art to execute various control logics performed in the present disclosure. In addition, when the control logic is implemented in software, the processor 120 may be implemented as a set of program modules. At this time, the program module may be stored in a memory and executed by the processor 120. The memory may be provided in or out of the processor 120, and may be connected to the processor 120 by various well-known means.

In addition, the module strain estimating apparatus 100 according to an embodiment of the present disclosure may further include a storage unit 130. The storage unit 130 may store programs, data and the like required for diagnosing a state of a battery according to the present disclosure. That is, the storage unit 130 may store data necessary for operation and function of each component of the module strain estimating apparatus 100 according to an embodiment of the present disclosure, data generated in the process of performing the operation or function, or the like. The storage unit 130 is not particularly limited in its kind as long as it is a known information storage means that can record, erase, update and read data. As an example, the information storage means may include RAM, flash memory, ROM, EEPROM, registers, and the like. In addition, the storage unit 130 may store program codes in which processes executable by the processor 120 are defined.

For example, information such as parameters and program codes for the learning module may be stored in the storage unit 130. In addition, the processor 120 may obtain information about the learning module by accessing the storage unit 130 whenever estimating the strain of the battery module 10.

Figure 7:
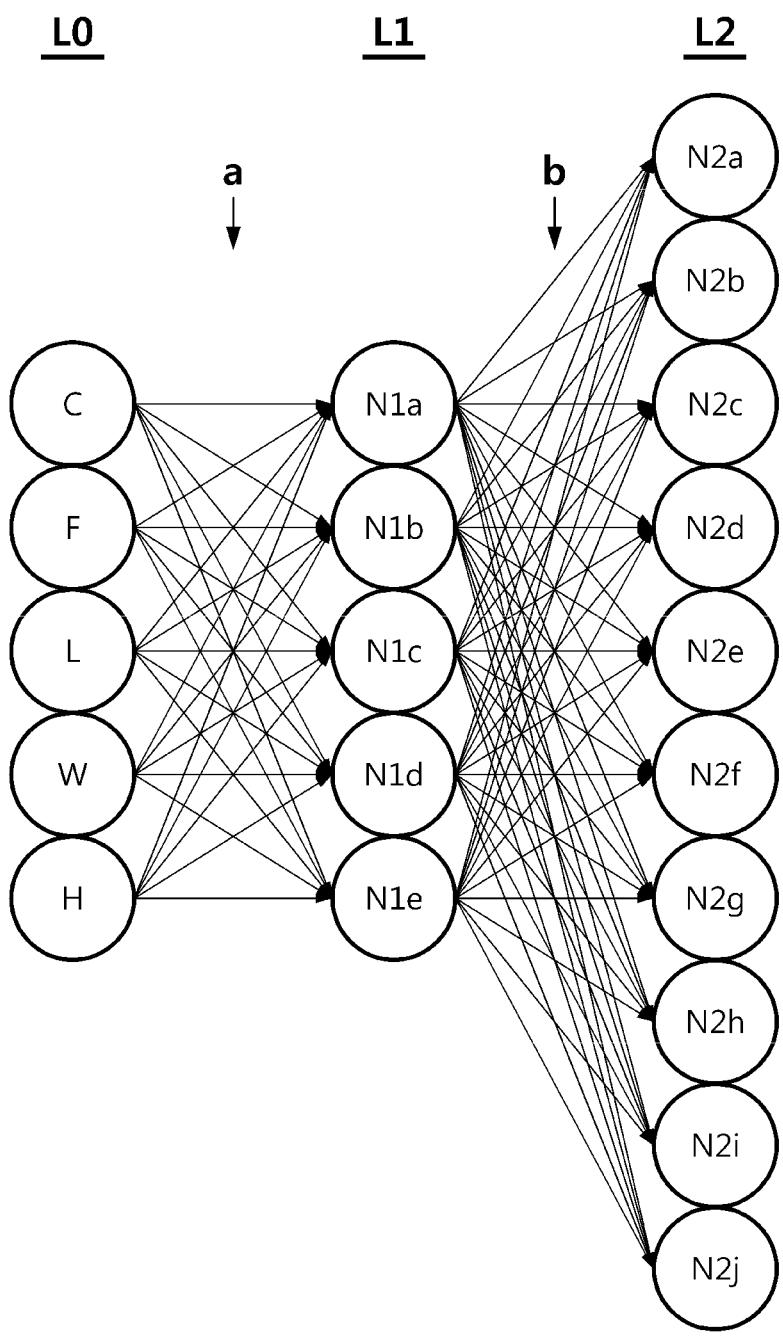
FIG. 7 is a diagram schematically showing an exemplary configuration of a learning module according to an embodiment of the present disclosure.

FIG. 7 is a diagram schematically showing an exemplary configuration of a learning module according to an embodiment of the present disclosure.

Referring to FIG. 7, the learning module may include an input layer L0, a first layer L1, and a second layer L2.

The input layer L0 may receive a plurality of numerical information of the battery module 10. That is, when the processor 120 inputs a plurality of numerical information of the battery module 10 to the learning module, the plurality of numerical information may be input to the input layer L0 of the learning module.

In the embodiment of FIG. 7, the plurality of numerical information of the battery module 10 are input in the order of the thickness C of the cover 12, the thickness F of the body unit 11, the length L of the battery module 10, the width W of the battery module 10, and the height H of the battery module 10, but it should be noted that the input order of the plurality of resin information is not limitedly applied in the embodiment of FIG. 7.

The first layer L1 may be configured to endow a first weight (a) corresponding to each of the plurality of numerical information based on a pre-trained result for the criterion module.

For example, in the embodiment of FIG. 7, the first weight (a) may be endowed to each of the plurality of numerical information. The first weight (a) is a weight generated in the process of pre-learning the learning module, and the first weight (a) may be endowed to all paths from the input layer L0 to the first layer L1.

More specifically, the first layer L1 may include a plurality of nodes respectively corresponding to the plurality of combination information.

For example, in the embodiment of FIG. 7, the first layer L1 may include a first node N1$a$, a second node N1$b$, a third node N1$c$, a fourth node N1$d$, and a fifth node N1$e$. Preferably, the number of nodes included in the input layer L0, that is, the number of the plurality of numerical information and the number of the plurality of nodes included in the first layer L1, may be the same.

In addition, the first layer L1 may be configured such that the first weight (a) corresponding to each of the plurality of numerical information is set for each of the plurality of nodes.

Referring to FIG. 7, the first weight (a) may be endowed to each of the plurality of numerical information. In addition, the first weight (a) may be set for each of the plurality of numerical information for each of the plurality of nodes N1$a$ to N1$e$ of the first layer L1. For example, the first weight (a) set for each of the plurality of numerical information for each of the plurality of nodes N1$a$ to N1$e$ of the first layer L1 may be different from each other.

Figure 8:
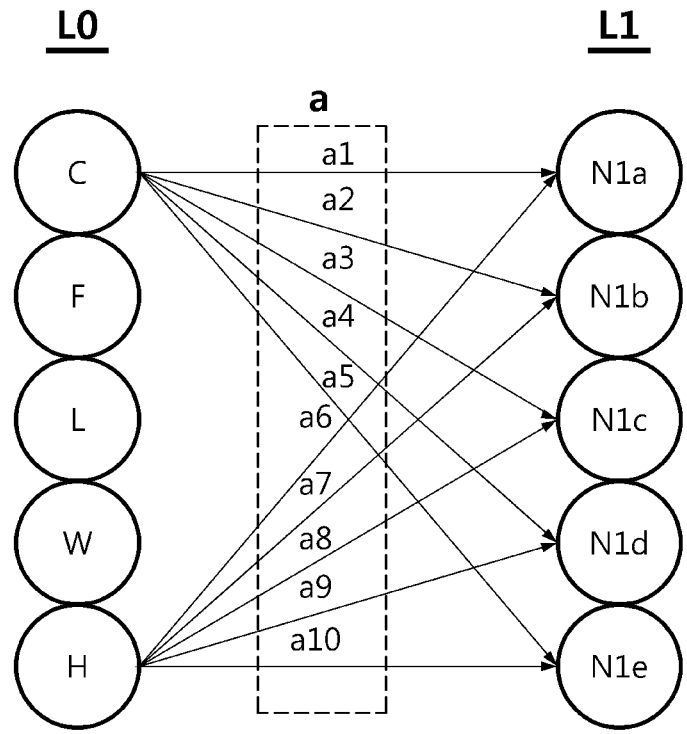
FIG. 8 is a diagram schematically showing a part of the exemplary configuration of the learning module according to an embodiment of the present disclosure.

FIG. 8 is a diagram schematically showing a part of the exemplary configuration of the learning module according to an embodiment of the present disclosure. Specifically, FIG. 8 is a diagram exemplarily showing the first weight (a) applied to the thickness C of the cover 12 and the height H of the battery module 10 among the plurality of numerical information.

Referring to FIG. 8, the thickness C of the cover 12 may be input to each of the plurality of nodes N1$a$ to N1$e$ of the first layer L1. However, when the thickness C of the cover 12 is input to the first layer L1, the first weight (a) corresponding to each of the plurality of nodes N1$a$ to N1$e$ of the first layer L1 may be added to the thickness C of the cover 12.

For example, when the thickness C of the cover 12 is input to each of the first to fifth nodes N1$a$ to N1$e$ of the first layer L1, weights a1 to a5 may be endowed to the thickness C of the cover 12, respectively. Here, each of the weights a1 to a5 may be a weight preset for each of the first to fifth nodes N1$a$ to N1$e$ of the first layer L1 with respect to the thickness C of the cover 12. That is, the thicknesses C of the cover 12 input to the first to fifth nodes N1$a$ to N1$e$ of the first layer L1 may be different from each other depending on the endowed weights a1 to a5.

Also, for example, when the height H of the battery module 10 is input to each of the first to fifth nodes N1$a$ to N1$e$ of the first layer L1, weights a6 to a10 may be endowed to the height H of the battery module 10, respectively. Here, each of the weights a6 to a10 may be a weight preset for each of the first to fifth nodes with respect to the height H of the battery module 10. That is, the heights H of the battery module 10 input to the first to fifth nodes N1$a$ to N1$e$ of the first layer L1 may be different from each other depending on the endowed weights a6 to a10.

In addition, the first layer L1 may be configured to generate a plurality of combination information based on the plurality of numerical information to which the first weight (a) is endowed.

For example, in the embodiment of FIG. 7, in each of the plurality of nodes N1a to N1e of the first layer L1, a plurality of numerical information to which a corresponding first weight (a) is endowed may be combined with each other. In addition, a plurality of combination information may be generated by such a combination. Preferably, the number of the plurality of generated combination information may be equal to the number of the plurality of numerical information input to the input layer L0.

In addition, the second layer L2 may be configured to endow a second weight (b) corresponding to each of the plurality of combination information generated in the first layer L1 based on the pre-trained result.

For example, in the embodiment of FIG. 7, the second weight (b) may be endowed to each of the plurality of combination information. The second weight (b) is a weight generated in the process of pre-learning the learning module, and the second weight (b) may be endowed to all paths from the first layer L1 to the second layer L2.

More specifically, the second layer L2 may include a plurality of strain corresponding to the plurality of forces and a plurality of nodes respectively corresponding to the plurality of stresses.

For example, in the embodiment of FIG. 7, the second layer L2 may include 10 nodes N2a to N2j. Here, the first to fifth nodes N2a to N2e of the second layer L2 may be nodes related to the strain of the battery module 10, and the sixth to tenth nodes N2f to N2j of the second layer L2 may be nodes related to the stress of the battery module 10.

In addition, the second layer L2 may be configured such that the second weight (b) corresponding to each of the plurality of combination information is set for each of the plurality of nodes N2a to N2j.

Referring to FIG. 7, the second weight (b) may be endowed to each of the plurality of combination information. In addition, the second weight (b) may be set for each of the plurality of combination information for each of the plurality of nodes N2a to N2j of the second layer L2. For example, the second weight (b) set for each of the plurality of combination information for each of the plurality of nodes N2a to N2j of the second layer L2 may be different from each other.

The second layer L2 may be configured to generate a strain and a stress for the battery module 10 corresponding to each of the plurality of forces based on the plurality of combination information to which the second weight (b) is endowed.

More specifically, referring to FIGS. 4 and 7, the first to fifth nodes N2a to N2e of the second layer L2 may be related to strain for 2 kN, 4 kN, 6 kN, 8 kN and 10 kN forces, respectively. For example, the first node N2a of the second layer L2 may generate a strain for a force of 2 kN, the second node N2b may generate a strain for a force of 4 kN, and the third node N2c may generate a strain for a force of 6 kN. The fourth node N2d may generate a strain for a force of 8 kN, and the fifth node N2e may generate a strain for a force of 10 kN.

In addition, referring to FIGS. 5 and 7, the sixth to tenth nodes N2f to N2j of the second layer L2 may be related to stresses for 2 kN, 4 kN, 6 kN, 8 kN, and 10 kN forces, respectively. For example, the sixth node N2f of the second layer L2 may generate a stress for a force of 2 kN, the seventh node N2g may generate a stress for a force of 4 kN, and the eighth node N2h may generate a stress for a force of 6 kN. The ninth node N2i may generate a stress for a force of 8 kN, and the tenth node N2j may generate a stress for a force of 10 kN.

The processor 120 may be configured to generate the first profile P1 by receiving the strain for the battery module 10 corresponding to each of the plurality of forces from the learning module and generate the second profile P2 by receiving the stress for the battery module 10 corresponding to the plurality of forces from the learning module.

As in the previous embodiment, it is assumed that the first to fifth nodes N2a to N2e of the second layer L2 are related to strain, and the sixth to tenth nodes N2f to N2j are related to stress. The processor 120 may generate the first profile P1 according to the embodiment of FIG. 4 by receiving the strains for 2 kN, 4 kN, 6 kN, 8 kN and 10 kN forces from the first to fifth nodes N2a to N2e of the second layer L2. In addition, the processor 120 may generate the second profile P2 according to the embodiment of FIG. 5 by receiving the stresses for 2 kN, 4 kN, 6 kN, 8 kN and 10 kN forces from the sixth to tenth nodes N2f to N2j of the second layer L2.

The processor 120 may be configured to generate the third profile P3 by matching the strain and the stress for the battery module 10 corresponding to each of the plurality of forces based on the first profile P1 and the second profile P2.

Referring to FIGS. 4 to 6, the first profile P1 and the second profile P2 may include information about the plurality of forces in common. Accordingly, the processor 120 may generate the third profile P3 representing the correspondence between the strain and the stress of the battery module 10 based on the plurality of forces.

Referring to FIG. 1, the module strain estimating apparatus 100 according to an embodiment of the present disclosure may further include a pressure information obtaining unit 140.

The pressure information obtaining unit 140 may be configured to obtain pressure information for a target pressure from the outside.

Specifically, the pressure information obtaining unit 140 may include a communication module and/or an input module. The pressure information obtaining unit 140 may receive the pressure information for the target pressure from the outside through wired and/or wireless communication. In addition, the pressure information obtaining unit 140 may interpret the information input through the input module to obtain the pressure information for the target pressure. For example, the input module may employ various input devices such as a keyboard, a mouse, and a touch screen.

The processor 120 may be configured to receive the pressure information from the pressure information obtaining unit 140.

Specifically, the processor 120 and the pressure information obtaining unit 140 may be connected to communicate with each other. Accordingly, the processor 120 may receive the pressure information for the target pressure from the pressure information obtaining unit 140.

The processor 120 may be configured to estimate a strain of the battery module 10 with respect to the target pressure by inputting the target pressure to the third profile P3.

For example, when the module strain estimating apparatus 100 according to an embodiment of the present disclosure is used in the process of designing the battery module 10, the third profile P3 for the battery module 10 being designed may be generated by the processor 120. In addition, in order to estimate the amount of change of the battery module 10 in a maximum pressure that can be applied by the swelling of the battery cell, pressure information about the maximum pressure may be input to the pressure information obtaining unit 140. That is, the maximum pressure input to the pressure information obtaining unit 140 may be the target pressure. The processor 120 may receive the pressure information for the maximum pressure, and estimate the strain of the battery module 10 corresponding to the maximum pressure based on the third profile P3. After that, if the strain estimated by the processor 120 is within an acceptable range, the battery module 10 may be manufactured based on the designed contents, and if the estimated strain is out of the acceptable range, the design for battery module 10 may be modified.

Since the module strain estimating apparatus 100 according to an embodiment of the present disclosure may quickly estimate the stress and the strain of the battery module 10 as above, there is an advantage that the stress and the strain may be very usefully used in the process of designing the battery module 10.

In addition, if only the plurality of numerical information of the battery module 10 are determined even before the battery module 10 is manufactured, since the third profile P3 may be generated to derive correspondence between stress and strain, there is an advantage that the battery module 10 may be designed more easily.

In addition, the module strain estimating apparatus 100 according to the present disclosure may be provided to a battery pack. That is, the battery pack according to the present disclosure may include the above-described module strain estimating apparatus 100 and a battery module 10. In addition, the battery pack may further include electrical equipment (relays, fuses, etc.) and a case.

For example, the module strain estimating apparatus 100 included in the battery pack may estimate the strain of one or more battery modules 10 included in the battery pack. That is, the module strain estimating apparatus 100 may quickly diagnose whether the battery module 10 is damaged according to the swelling pressure based on the correspondence among the swelling pressure (force applied from the inside), the stress and the strain for each battery module 10.

Figure 9:
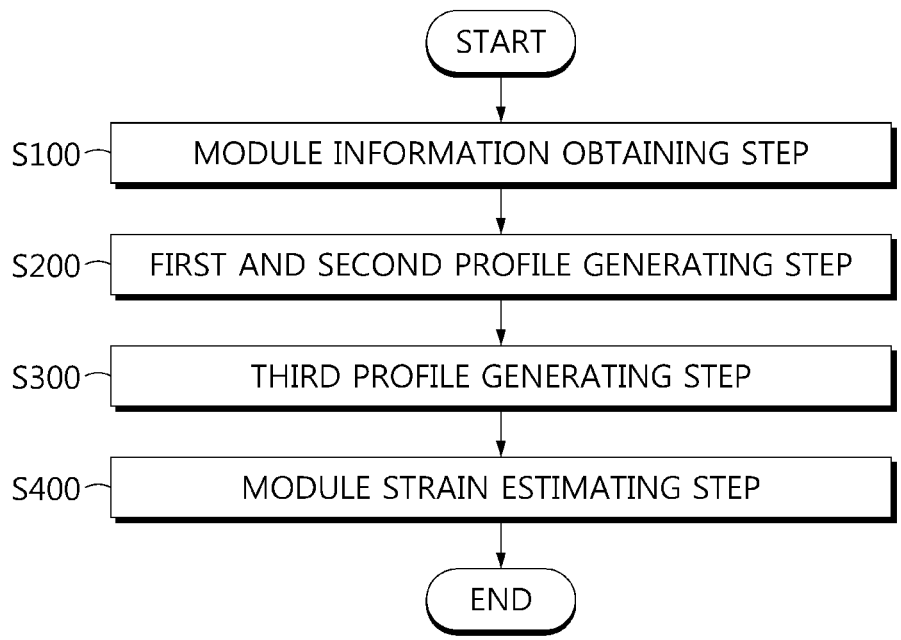
FIG. 9 is a diagram schematically showing a module strain estimating method according to another embodiment of the present disclosure.

FIG. 9 is a diagram schematically showing a module strain estimating method according to another embodiment of the present disclosure.

Preferably, each step of the module strain estimating method may be performed by the module strain estimating apparatus 100.

Referring to FIG. 9, the module strain estimating method may include a module information obtaining step (S100), a first and second profile generating step (S200), a third profile generating step (S300) and a module strain estimating step (S400).

The module information obtaining step (S100) is a step of obtaining a plurality of numerical information for the battery module 10, and may be performed by the module information obtaining unit 110.

For example, referring to FIGS. 2 and 3, the module information obtaining unit 110 may obtain a plurality of numerical information including the thickness C of the cover 12, the thickness F of the body unit 11, the height H of the battery module 10, the width W of the battery module 10, and the length L of the battery module 10.

The first and second profile generating step (S200) is a step of generating a first profile P1 representing a correspondence between a force applied from the inside of the battery module 10 to the outside and a strain of the battery module 10 and a second profile P2 representing a correspondence between the force and a stress of the battery module 10, and may be performed by the processor 120.

For example, in the embodiment of FIG. 4, the processor 120 may generate the first profile P1 representing the correspondence between the force applied from the inside of the battery module 10 to the outside and the strain of the battery module 10 based on the plurality of numerical information obtained by the module information obtaining unit 110 and the preset learning module.

In addition, in the embodiment of FIG. 5, the processor 120 may generate the second profile P2 representing the correspondence between the force applied from the inside of the battery module 10 to the outside and the stress of the battery module 10, based on the plurality of numerical information obtained by the module information obtaining unit 110 and the preset learning module.

The third profile generating step (S300) is a step of generating a third profile P3 representing a correspondence between the strain and the stress of the battery module 10 based on the first profile P1 and the second profile P2, and may be performed by the processor 120.

For example, in the embodiment of FIG. 6, the processor 120 may generate the third profile P3 representing the correspondence between the stress and the strain of the battery module 10 based on the first profile P1 and the second profile P2.

The module strain estimating step (S400) is a step of estimating the strain of the battery module 10 according to the stress of the battery module 10 based on the third profile P3, and may be performed by the processor 120.

Specifically, the processor 120 may judge the design suitability of the battery module 10 according to the correlation between the stress and the strain of the battery module 10 based on the third profile P3.

For example, the processor 120 may estimate the strain of the battery module 10 for the target pressure input from the outside, based on the third profile P3. That is, the processor 120 may judge the design suitability of the battery module 10 based on the estimated strain.

The embodiments of the present disclosure described above are not necessarily implemented by an apparatus and method but may also be implemented through a program for realizing functions corresponding to the configuration of the present disclosure or a recording medium on which the program is recorded. Such implementation may be easily performed by those skilled in the art from the above description of the embodiments.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

Additionally, many substitutions, modifications and changes may be made to the present disclosure described hereinabove by those skilled in the art without departing from the technical aspects of the present disclosure, and the present disclosure is not limited to the above-described embodiments and the accompanying drawings, and each embodiment may be selectively combined in part or in whole to allow various modifications.

REFERENCE SIGNS

10: battery module
11: body unit

12: cover
13: accommodation space
100: module strain estimating apparatus
110: module information obtaining unit
120: processor
130: storage unit
140: pressure information obtaining unit

What is claimed is:

1. A module strain estimating apparatus, comprising:
   a module information obtaining unit configured to obtain a plurality of numerical information for a battery module; and
   a processor configured to:
   receive the plurality of numerical information from the module information obtaining unit,
   generate a first profile representing a correspondence between a force applied from the inside to the outside of the battery module and a strain of the battery module, and a second profile representing a correspondence between the force and a stress of the battery module based on a preset learning module and the plurality of numerical information,
   generate a third profile representing a correspondence between the strain and the stress of the battery module based on the first profile and the second profile, and
   estimate the strain of the battery module according to the stress of the battery module based on the third profile.

2. The module strain estimating apparatus according to claim 1, wherein the battery module is configured to include;
   a body unit having one surface opened so that one or more battery cells are accommodated therein; and
   a cover configured to be coupled to the opened one surface, and
   wherein the module information obtaining unit is configured to obtain a thickness of the cover, a thickness of the body unit, a height of the battery module, a width of the battery module, and a length of the battery module as the plurality of numerical information of the battery module.

3. The module strain estimating apparatus according to claim 1, further comprising:
   a pressure information obtaining unit configured to obtain pressure information for a target pressure from the outside,
   wherein the processor is configured to estimate a strain of the battery module for the target pressure by receiving the pressure information from the pressure information obtaining unit and inputting the target pressure to the third profile.

4. A battery pack, comprising the module strain estimating apparatus according to claim 1.

5. The module strain estimating apparatus according to claim 1, wherein the preset learning module learns to estimate a strain and a stress corresponding to each of a plurality of forces preset for a criterion module.

6. The module strain estimating apparatus according to claim 5, wherein the preset learning module includes:
   a first layer configured to endow a first weight corresponding to each of the plurality of numerical information based on a pre-trained result for the criterion module, and generate a plurality of combination information based on the plurality of numerical information to which the first weight is endowed; and
   a second layer configured to endow a second weight corresponding to each of the plurality of combination information generated at the first layer based on the pre-trained result, and generate the strain and the stress for the battery module corresponding to each of the plurality of forces based on the plurality of combination information to which the second weight is endowed.

7. The module strain estimating apparatus according to claim 6, wherein the first layer includes a plurality of nodes respectively corresponding to the plurality of combination information and is configured to set the first weight corresponding to each of the plurality of numerical information for each of the plurality of nodes.

8. The module strain estimating apparatus according to claim 6, wherein the second layer includes a plurality of nodes respectively corresponding to a plurality of strains and a plurality of stresses corresponding to each of the plurality of forces and is configured to set the second weight corresponding to each of the plurality of combination information for each of the plurality of nodes.

9. The module strain estimating apparatus according to claim 6, wherein the processor is configured to generate the first profile by receiving a strain for the battery module corresponding to each of the plurality of forces from the learning module, and generate the second profile by receiving a stress for the battery module corresponding to the plurality of forces from the learning module.

10. The module strain estimating apparatus according to claim 9, wherein the processor is configured to generate the third profile by matching a strain and a stress for the battery module corresponding to each of the plurality of forces based on the first profile and the second profile.

11. A module strain estimating method, comprising:
    a module information obtaining operation of obtaining a plurality of numerical information for a battery module;
    a first and second profile generating operation of generating a first profile representing a correspondence between a force applied from the inside to the outside of the battery module and a strain of the battery module, and a second profile representing a correspondence between the force and a stress of the battery module based on a preset learning module and the plurality of numerical information;
    a third profile generating operation of generating a third profile representing a correspondence between the strain and the stress of the battery module based on the first profile and the second profile; and
    a module strain estimating operation of estimating the strain of the battery module according to the stress of the battery module based on the third profile.

* * * * *